United States Patent Office 3,212,932
Patented Oct. 19, 1965

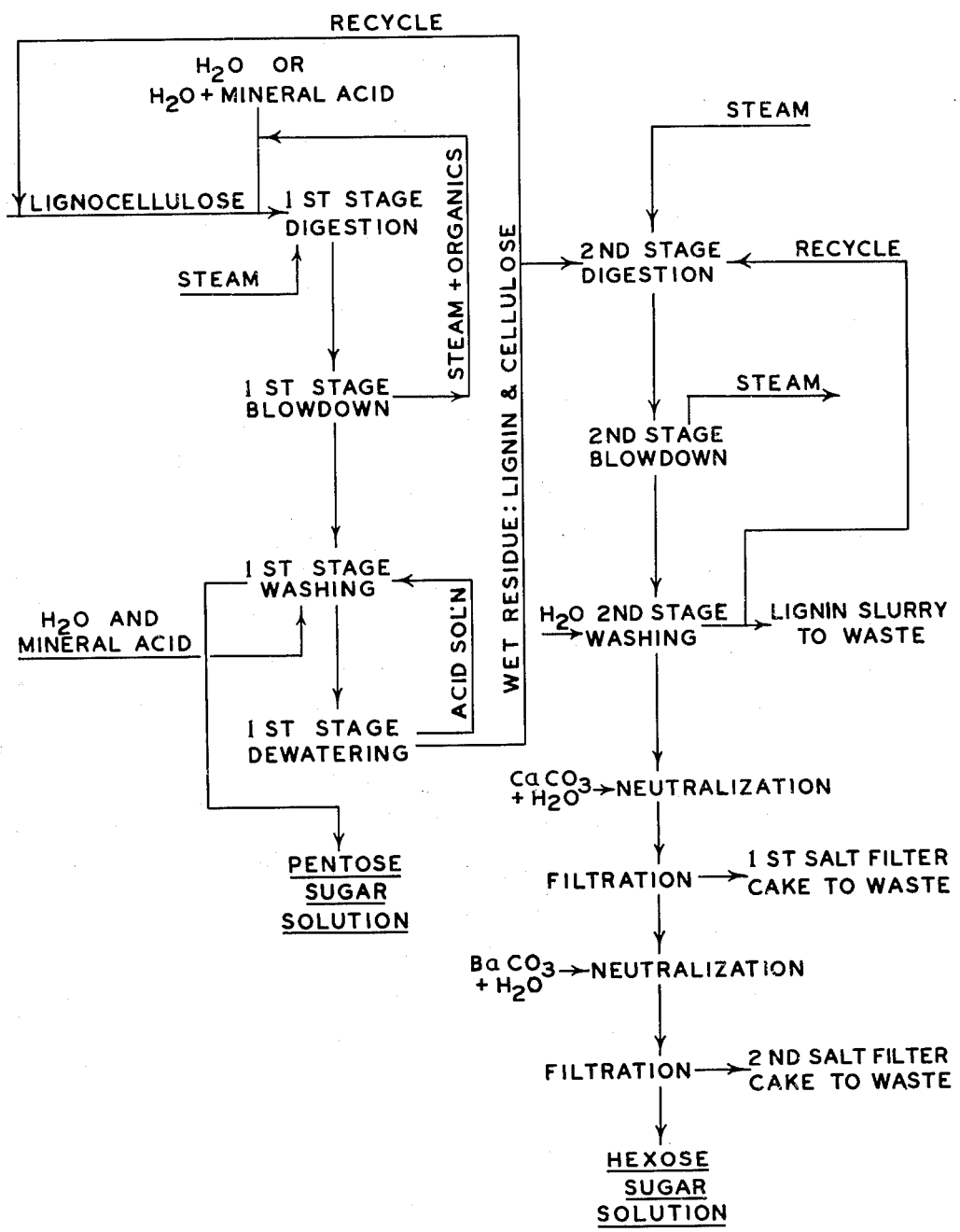

3,212,932
SELECTIVE HYDROLYSIS OF LIGNOCELLULOSE MATERIALS
Robert W. Hess, Beaverton, Oreg., Alfred M. Thomsen, San Francisco, Calif., Frank Porter, Morristown, N.J., and John W. Anderson, Portland, Oreg., assignors of one-half to Georgia-Pacific Corporation, Portland, Oreg., a corporation of Georgia, and one-half to Allied Chemical Corporation, New York, N.Y., a corporation of New York
Filed Apr. 12, 1963, Ser. No. 272,697
10 Claims. (Cl. 127—37)

This invention relates to a process for the selective hydrolysis of lignocellulose materials.

More particularly, the invention pertains to a process for hydrolizing lignocellulose materials in two stages. In the first stage, the hemicellulose content of the material is converted selectively to pentose sugars. These are removed, leaving the lignin and cellulose content of the original material substantially unaltered. In the second stage, the residual cellulose is hydrolyzed selectively to hexose sugars, leaving the lignin in large measure unhydrolyzed. The hexose sugars then are separated from the lignin residue.

A selective hydrolysis of this character is of the greatest interest in applications such as the conversion of lignocellulose materials to stock feed. In these applications, which heretofore have been uneconomical and unsuccessful on a commercial scale, part of the sugars derived from the hydrolytic reactions are fermented by yeast, thereby supplying a protein food component. This then may be mixed with another part of the sugars, or fed separately to provide a stock diet containing both proteins and carbohydrates.

The present invention provides a means for producing pentose sugars and hexose sugars in separate fractions, so that each may be applied as desired in the formulation of the stock feed. In addition, each may be applied separately to the various other commercial uses to which the pentose and hexose sugars are applicable.

Considering the foregoing in greater detail and with particular reference to the drawing, providing a schematic flow plan of the hereindescribed procedure:

The lignocellulose materials which may be employed in the selective hydrolysis of the present invention broadly comprise those classes of lignolcellulose materials which stem from plant growth processes and are readily available as waste by-products of various industries. Thus they may comprises such plant-derived materials as oat hulls, corn stalks and bagasse. In particular, however, they comprise the woods of various species of trees.

The lingocellulose material requires no special treatment preliminary to its use, although it should be reduced to a finely divided state if it already is not present in that condition. Thus wood may be employed to advantage in the form of sawdust, wood shavings, thin chips, flakes, and the like.

FIRST STAGE HYDROLYSIS

As indicated above, in the first stage of the procedure the lignocellulose material is heated with a first aqueous liquor of such a nature, and under such conditions, as to hydrolyze selectively the hemicellulose content of the lignocellulose, forming pentose sugars as the desired product.

In the execution of the first stage treatment it is not necessary to pretreat the lignocellulose material, as by adujsting its moisture content, or pre-soaking it with preliminary reagents. However, it is very desirable to premix the lignocellulose intimately with the selected aqueous liquor before subjecting the mixture to elevated temperatures and pressures. This is especially desirable since in the first stage the liquor to solids ratio is maintained at a relatively low level.

Accordingly, the lignocellulose material and treating liquor are premixed in a suitable apparatus such as a double ribbon blender, a pug mill, a rotary drum mixer, or like apparatus. The mixing is continued until the treating liquor has been distributed uniformly throughout the charge, thereby avoiding both starved regions and regions where there is a surplus of treating agent.

This, in turn, insures that during the hydrolytic treatment there will not be areas where some of the lignocellulose material is not acted upon, nor will there be areas wherein a surplus of treating agent induces undesired conversion of the cellulose, and degradation of the lignin. It has been found, in fact, that, by premixing thoroughly, a uniformity of reaction occurs throughout the entire reaction mixture which results in improving the conversion of hemicellulose to pentose and other derivative sugars.

The amount and character of treating agent to be premixed with the lignocellulosic material is such as to be constant with the primary objective of the process, i.e., that of selectively converting in the first stage treatment the hemicellulose to its derivative sugars. Hence the concentration of mineral acid included in the treating agent is kept as a very low level, not over 0.3% by weight. Indeed, it usually is preferred to carry out the treatment in the substantial absence of added mineral acid, relying upon the inherently acid pH of the lignocellulosic reaction mixture to break down the hemicellulose in the desired manner.

Likewise, the charging liquor to solids ratio is maintained at a very low level, i.e. a level of from 1:1–5:1, preferably from 1:1–3:1. In the conventional wood hydrolysis procedues, liquor to solids ratio of the order of 6:1 has been employed.

Various factors may be controlled in order to arrive at the desired liquor to solids weight ratio. This is possible since the water component of the liquor is derived in part from each of three sources.

First, the inherent moisture content of the lignocellulosic material contributes a certain proportion of water. Next the water added in the premix stage contributes a further proportion. Finally, where the reaction mixture is heated by direct steam injection, the condensed steam contributes a stull further proportion. Hence control of the amount of water furnished by each of these three sources makes it possible to regulate accurately the final liquor to solids ratio of the mixture.

In the preferred practice of the invention, the amount of water used in premixing may be relatively small, for example, sufficient only to provide a liquid to solids charging ratio of 1.5:1. However, sufficient water then is added during the heating by steam injection to increase the amount of water present unitl a final liquor-solid ratio of from 4–5:1 is attained.

Where a mineral acid is included in the aqueous treating liquor, it may comprise any of the common mineral acids which do not react with lignocellulosic materials to cause the occurrence of undesirable side reactions. Illustrative of suitable acids are hydrochloric acid, phosphoric acid and, particularly, sulfuric acid. Acid-acting salts such as monosodium phosphate and sodium acid sulfate also may be used to provide all or part of the acid content of the liquor.

The premixed lignocellulose and aqueous liquor are introduced into a suitable pressure vessel. This may be either a continuous or batch pressure reactor provided with means for heating the charge to the predetermined temperature at the predetermined pressure. As stated before, this may be accomplished by direct steam injection.

Within the reactor the pressure upon the charge is increased as rapidly as possible to a value of from 100–700 p.s.i.g., preferably from 250–600 p.s.i.g., the temperature being increased contemporaneously to the corresponding levels for saturated steam. These conditions are maintained for a relatively brief period of time, sufficient only to convert substantially selectively the hemicellulose content of the lignocellulose to pentose and hexose sugars. In the average case this requires but from 0.3–10 minutes, the time being in substantially inverse relation to the temperature applied. That is, the higher the temperature, the shorter the time, and vice versa.

As a result, there is formed a first liquor product containing a substantial proportion of pentose sugars, together with a small amount of volatile organic acids such as acetic acid, as well as the residual mineral acid if a mineral acid is included in the first instance. There also is formed a first solid residue which is substantially free from pentosans and contains predominantly unhydrolyzed lignin and unhydrolyzed cellulose.

The pressure next is reduced preliminary to separation of the liquor and solid residue products. Whereas the time required for pressure reduction by prior art procedures has been very long, i.e. of the order of several hours, it is important for the success of the presently described process that it be kept at a very low value. Thus there is a substantially instantaneous reduction of pressure resulting in what is termed herein a "flash blowdown." Where a continuous reactor is employed, the blowdown time is but a few seconds. Where a large batch reactor is used, the blowdown time is but a few minutes.

Such a rapid reduction in pressure has several significant effects.

First, it rapidly stops the hydrolytic reaction. This in turn minimizes the production of hexose sugars from degradation of the cellulose. It also minimizes production of lignin degradation products and prevents the decomposition of the desired sugar products.

Secondly, the flash blowdown evaporates some of the water which is present. The resultant steam then may be employed to advantage in a heat exchange with the material charged in the reactor.

Third, the flash blowdown flashes off acetic acid, formic acid, or other organic volatiles which may have been formed as by-products of the reaction. There thus is provided a built-in operation for separating and removing impurities from the reaction products.

Fourth, the flash blowdown explodes the particles of the solid residue. This makes them porous, opening them up for more efficient treatment in the second hydrolytic stage.

The flash blowdown may be carried out in any suitable apparatus. In a continuous process, it may be carried out to advantage by continuously passing the charge from the reactor into a cyclone separator specially designed to handle large volumes of material and resistant to corrosion and abrasion.

The volatile fraction resulting from the blowdown step, comprising steam and volatile organics, may be exhausted through a suitable heat exchange system. In the alternative, as is indicated in the flow plan, it may be condensed, and recycled to the treatment of an additional quantity of lignocellulose with or without the preliminary separation of its organic content.

The residue remaining from the blowdown contains water-insoluble lignin, and cellulose. In addition, it contains water-soluble pentose and hexose sugars which it is desirable to remove.

Accordingly the residue is passed through a suitable separator and treated with a selected liquid. This advantageously may be an aqueous solution of mineral acid, for example, a .5% solution of sulfuric acid. The separation is carried out preferably by continuous displacement washing of countercurrent streams in a tower. In the tower, the solids settle downwardly, becoming saturated with acid, while the liquor rises upwardly, displacing the sugar solution. The latter is withdrawn by the application of this technique in a relatively high concentration of the order of 5–12% by weight.

The pentose sugar liquor thus obtained represents one of the final products of the herein described process. It may be stored, or applied to its various uses. For example, it may be neutralized to a pH of 4–5 with calcium carbonate, ammonia or other basic material and thereafter inoculated with yeast in the production of a protein stock feed.

The solid residue resulting from the first stage treatment then is returned to the same or a separate reactor, adding more mineral acid if that remaining in it from the above described washing procedure is not sufficient for the second stage treatment.

SECOND STAGE HYDROLYSIS

The reaction conditions in the second stage reactor are more strenuous than those prevailing in the first stage reactor. They have as their object the conversion of the cellulose to hexose sugars without inducing undue degradation of the lignin.

Accordingly the charging liquor to solids ratio is maintained within the broad range of from 1:1–5:1, preferably from 1:1–3:1. The mineral acid concentration of the liquor treating agent is maintained at a level of from 0.3–3.0% by weight.

The reactor is heated indirectly, or preferably by the direct injection of steam, until a pressure of 150 to 900 p.s.i.g., preferably from 400–800 p.s.i.g. and corresponding temperatures for saturated stem, are reached.

The reactor is maintained under the foregoing conditions for a time which is in substantially inverse relation to the temperature, i.e. the higher the temperature the shorter the time and vice versa. During this time, which is within the range of from 0.3 to 10 minutes, the cellulose content of the charge is converted substantially selectively to hexose sugars, leaving a solid residue containing predominantly unhydrolyzed lignin.

As in the first stage, it is highly desirable to terminate the reaction abruptly in order to minimize production of undesired degradation products, in order to evaporate excess water, in order to flash off any organic volatiles which may be present, and in order physically to modify the lignin residue so that it may be filtered and handled more easily.

For these reasons the charge of the reactor is subjected to a flash blowdown, as by passing it continuously to a blowdown cyclone apparatus. This reduces the pressure to atmospheric pressure in a matter of but a few seconds.

The steam from the blowdown apparatus is vented while the solid product is washed with water in a second stage extractor. The operation of this extractor results in separating the hexose sugar liquor from the cellulose-containing lignin residue, which is recycled or passed to waste.

Thereafter the liquor is treated with a neutralizing agent such as calcium carbonate and any appropriate filter aid, more water is added if necessary, and the mixture filtered.

The resulting salt filter cake is discarded and the liquor subjected again, if necessary, to treatment with a neutralizing agent such as barium carbonate used with a suitable filter aid. It then is filtered again and the second salt filter cake discarded. This leaves as a product a hexose sugar liquor having a sugar content of 10–15%.

It may be evaporated, stored, or applied to its usual industrial uses.

The process of the invention is illustrated by the following example.

*Example*

1000 parts by weight of Douglas fir sawmill waste including largely sawdust and shavings was mixed in a double ribbon blender with 2000 parts of dilute sulfuric acid solution having a concentration of 0.1%.

The resulting mixture was passed into a continuous pressure reactor at an initial liquor to solids ratio of 1.6 to 1.

In the reactor the mixture was subjected to a pressure of 294 p.s.i.g. and a temperature of 215° C. for a dwell time of 5 minutes. During the reaction the pressure and temperature were attained and maintained by direct injection of steam. This resulted in increase of the liquor to solids ratio to a level of 3.9 to 1.

The material was transferred to a blowdown cyclone separator which lowered the pressure to atmospheric pressure in 1 minute. The steam fraction was treated for removal of volatile acetic acid and other volatile organics after which the liquid was recycled to the reactor.

The solid residue consisting of unhydrolyzed lignin, cellulose, and absorbed pentose sugars was transferred to an extractor where it was passed countercurrent to a dilute sulfuric acid solution containing 0.5% by weight of sulfuric acid. This resulted in the displacement washing of the solids, leading to the separation of an aqueous solution containing about 10% reducing sugars. The total yield of such sugars was 280 parts, of which 152 parts were pentoses and 128 parts were hexoses. A small amount of other organic materials also was present.

The solid fraction from the first stage extractor was dewatered and transferred to a second stage digester. Its initial liquor to solids ratio was 1.6 to 1. The mineral acid concentration was 0.79% by weight.

The pressure and temperature within the reactor were raised to 590 p.s.i.g. and 252° C. respectively, by the direct injection of steam. This resulted in alteration of the liquor to solids ratio to a value of from 6 to 8.

The contents of the reactor were held at temperature and pressure for 1 minute. Thereafter they were transferred to a flash blowdown cyclone separator.

The steam from the separator was vented. The solid residue was passed to a countercurrent second stage extractor where it was washed with water. The lignin slurry (600 parts) resulting from the extraction was passed to waste.

12 parts of calcium carbonate were added together with 0.5 part of diatomaceous earth filter aid to the hexose sugar-containing solution. The resulting mixture was filtered and the resulting sulfate filter cake discarded.

The filtrate then was treated with 9 parts of barium carbonate and 0.5 part of filter aid. This mixture was filtered and the resulting carbonate filter cake thereafter discarded. The resulting sugar solution contained 10% hexose sugars and a relatively small amount of other organic materials. The total yield of hexose sugars was 160 pounds. The total yield of sugars from both stages was 44% of the theoretical.

Having thus described the invention in preferred embodiments, what is claimed as new and desired to protect by Letters Patent is:

1. A process for the selective hydrolysis of lignocellulose material which comprises:
   (a) heating the lignocellulose material in a first stage with a first aqueous treating agent,
   (b) using a treating agent to solids weight ratio within the range of from 1:1–5:1,
   (c) the treating agent having a mineral acid concentration of not over 0.3% by weight,
   (d) at a pressure of from 100–700 p.s.i.g. and corresponding temperatures for saturated steam,
   (e) for a time of from 0.3 to 10 minutes used in substantially inverse relation to the temperature, thereby hydrolyzing substantially selectively the hemicellulose content of the lignocellulose material without substantial decomposition of the sugars and forming a first liquor product containing pentose sugars and a first solid residue substantially free from pentosans and containing predominantly unhydrolyzed lignin and cellulose,
   (f) separating the first liquor product from the first solid residue,
   (g) heating the first solid residue in a second stage with a second aqueous mineral acid treating agent,
   (h) using a treating agent to solids ratio within the range of from 0.1:1–5:1,
   (i) the treating agent having a mineral acid concentration of from 0.3–3.0% by weight,
   (j) at a pressure of from 150–900 p.s.i.g. and corresponding temperatures for saturated steam,
   (k) for a time of from 0.3 to 10 minutes, used in substantially inverse relation to the temperature, thereby converting substantially selectively the cellulose content of the first solid residue to hexos sugars and forming a second liquor product containing predominantly hexose sugars and a second solid residue containing predominantly unhydrolyzed lignin,
   (l) and separating the second liquor product from the second solid residue.

2. The process of claim 1 wherein the lignocellulose material comprises wood.

3. The process of claim 1 wherein the treating agent to solids weight ratio in the both stages is 1:1–3:1.

4. The process of claim 1 wherein the lignocellulose is heated in the first stage with an aqueous liquor treating agent in the substantial absence of added mineral acid.

5. The process of claim 1 wherein the pressure in the first stage is from 250–600 p.s.i.g. and in the second stage from 400–800 p.s.i.g.

6. The process of claim 1 wherein at the conclusion of the first and second heating stages the pressure is reduced to substantially atmospheric pressure rapidly in flash blowdown operation.

7. The process of claim 1 wherein the lignocellulose and first aqueous liquor are premixed intimately preliminary to the first heating stage.

8. The process of claim 1 including the step of washing the first solid residue with dilute aqueous mineral acid, thereby contemporaneously removing the pentose sugars therefrom and impregnating it with acid requisite for the heating of the residue in the second stage.

9. The process of claim 1 wherein the first and second mineral acid treating agents comprise sulfuric acid and including the steps of neutralizing the second liquor product with calcium carbonate to form an insoluble salt filter cake, and thereafter filtering the neutralized second liquor product to remove the filter cake and produce a substantially acid-free hexose sugar solution.

10. The process for the selective hydrolysis of wood which comprises:
   (a) heating finely divided wood in a first stage with a first mineral-acid-containing aqueous liquor treating agent,
   (b) using a liquor treating agent to solids weight ratio within the range of from 1:1–3:1,
   (c) the liquor treating agent having a mineral acid concentration of not over 0.3% by weight,
   (d) at a pressure of from 250–600 p.s.i.g. and corresponding temperatures for saturated steam,
   (e) for from 0.3–10 minutes, thereby forming a first liquor product containing pentose sugars and a first solid residue containing predominantly unhydrolyzed lignin and cellulose,
   (f) reducing the pressure rapidly to substantially atmospheric pressure in a first flash blowdown stage, (g) separating the first liquor product from the first solid residue,
(h) heating the first solid residue in a second heating stage with a second aqueous liquor treating agent,
(i) using a liquor treating agent to solids ratio within the range of from 1:1 to 3:1,
(j) the liquor treating agent having a mineral acid concentration of from 0.3–3.0% by weight,
(k) at a pressure of from 400–800 p.s.i.g. and corresponding temperatures for saturated steam,
(l) for a time of from 0.3–10 minutes, thereby forming a second liquor product containing predominantly hexose sugars and a second solid residue containing predominantly hydrolyzed lignin,
(m) reducing the pressure rapidly to substantially atmospheric pressure in a second flash blowdown stage,
(n) and separating the second liquor product from the second solid residue.

References Cited by the Examiner

UNITED STATES PATENTS

| 2,356,500 | 8/44 | Boinot | 127—37 |
| 2,516,833 | 8/50 | Ant-Wuorinen | 127—37 |
| 2,734,836 | 2/56 | Elian et al. | 127—37 |
| 2,801,939 | 8/57 | Hignett et al. | 127—37 |

OTHER REFERENCES

Plow et al.: The Rotary Digester in Wood Saccharification, Ind. and Eng. Chem., vol. 37, January 1945, pp. 36–43.

Saeman: Kinetics of Wood Sacchrarification, Ind. and Eng. Chem., vol. 37, January 1945, pp. 43–52.

Perry: Chemical Engineers' Handbook, third edition, 1950, McGraw-Hill, New York, pp. 277–278 relied on.

MORRIS O. WOLK, *Primary Examiner*.